United States Patent
Wilby

(10) Patent No.: US 8,276,843 B2
(45) Date of Patent: Oct. 2, 2012

(54) VARIABLE STROKE REAR LANDING GEAR STRUT

(75) Inventor: Richard Wilby, Pibrac (FR)

(73) Assignee: Airbus, Blagnac (FR)

( * ) Notice: Subject to any disclaimer, the term of this patent is extended or adjusted under 35 U.S.C. 154(b) by 732 days.

(21) Appl. No.: 12/550,452

(22) Filed: Aug. 31, 2009

(65) Prior Publication Data

US 2010/0116931 A1 May 13, 2010

(30) Foreign Application Priority Data

Sep. 8, 2008 (FR) ...................................... 08 04915

(51) Int. Cl.
*B64C 25/10* (2006.01)

(52) U.S. Cl. ............ 244/102 SS; 244/102 R; 244/102 A

(58) Field of Classification Search ............... 244/102 A, 244/102 R, 102 SS, 103 R, 100 R, 111
See application file for complete search history.

(56) References Cited

U.S. PATENT DOCUMENTS

| 5,219,152 A | 6/1993 | Derrien |
| 5,397,173 A * | 3/1995 | Bourguet ........................ 303/2 |
| 6,345,564 B1 * | 2/2002 | Kilner et al. ................... 91/169 |
| 6,575,405 B2 * | 6/2003 | Bryant et al. ............ 244/102 SL |
| 2007/0221783 A1 | 9/2007 | Parks |
| 2008/0119967 A1 * | 5/2008 | Long et al. ........................ 701/3 |

FOREIGN PATENT DOCUMENTS

| DE | 10 2004 016341 | 12/2005 |
| GB | 505 263 | 5/1939 |
| GB | 1 012 604 | 12/1965 |
| JP | 06 321191 | 11/1994 |

OTHER PUBLICATIONS

Preliminary Search Report dated Apr. 28, 2009 w/ English translation.

* cited by examiner

*Primary Examiner* — Tien Dinh
*Assistant Examiner* — Jamie S Stehle
(74) *Attorney, Agent, or Firm* — Dickinson Wright PLLC

(57) ABSTRACT

A rear landing gear for an aircraft includes a strut configured to have a variable height at a lowered position. The strut is variable between a maximum height at which the aircraft has a substantially horizontal trim and a minimum height at which the aircraft has a nose-up trim, and includes a barrel and a shock absorber. The shock absorber bears a set of wheels and is slidably mounted in a passage of the barrel, the passage defining a variable-volume internal fluidic chamber. A source of fluidic power connects to the variable-volume internal chamber via a controllable shut-off member and is configured to fill or empty the variable-volume internal chamber with fluid, varying the height of the strut between the maximum height and the minimum height.

13 Claims, 3 Drawing Sheets

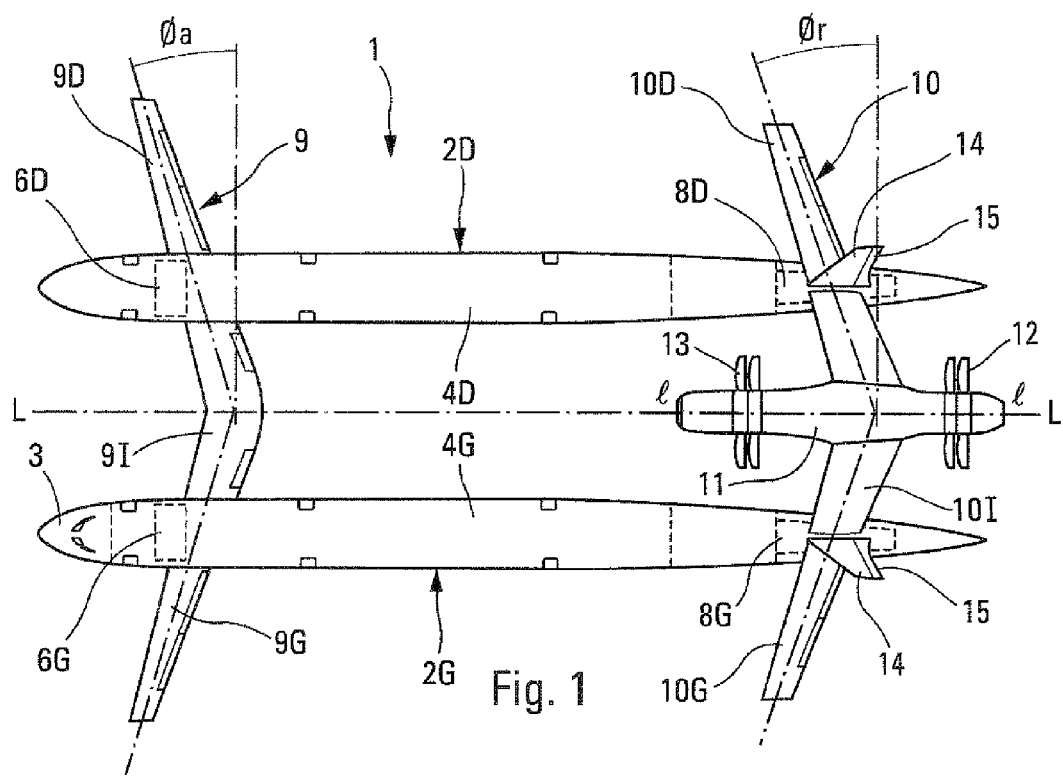
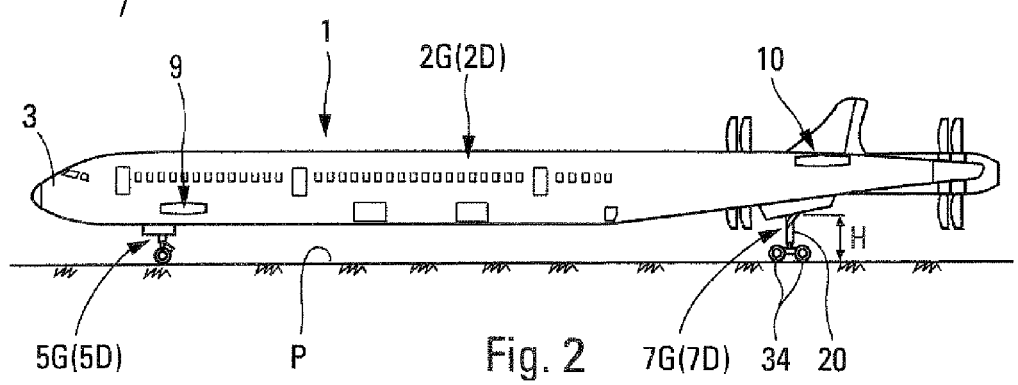
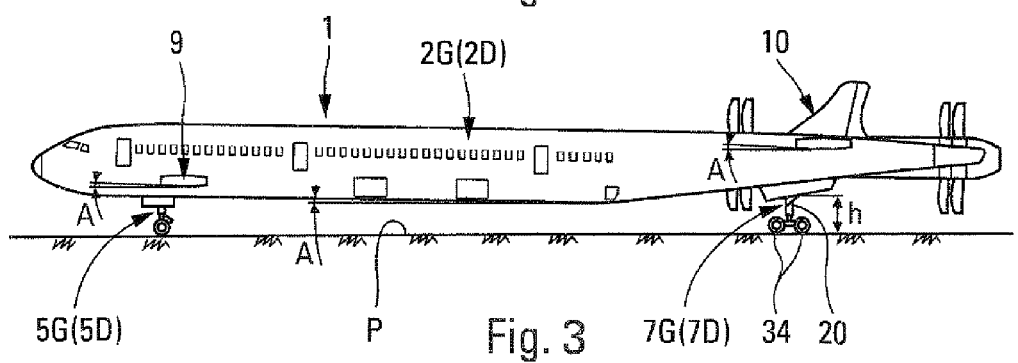

VARIABLE STROKE REAR LANDING GEAR STRUT

FIELD OF THE INVENTION

The present invention relates to a variable-height rear landing gear for an aircraft, making it possible, in particular, to modify the trim of this aircraft during the take-off phase.

BACKGROUND OF THE INVENTION

More specifically, although not exclusively, the rear landing gear according to the invention is intended to be mounted on jumbo jet aircraft, such as civilian airplanes capable of carrying a high payload (in terms of passengers and/or freight) or military airplanes such as bombers or refueling, troop transport and/or equipment transport airplanes.

It is known that the landing gear, particularly the rear landing gear, of these present or future jumbo jet airplanes (such as those with twin fuselages positioned in parallel) are equipped with several wheels arranged in single tandem or double tandem, them forming a bogie, in order to support the substantial weight of these airplanes and, in the case of military airplanes, to free up space under the fuselage for carrying weaponry.

However, the use of these tandem landing gears takes away the ability of the airplane to pivot about the tandem wheels at the time of take-off (by contrast with landing gears having one or two wheels twinned as in the form of a diabolo on one and the same axle), thus increasing the take-off distance of the airplane and therefore entailing longer runways.

Hence, to shorten this distance, there are a number of solutions that have already been proposed, including the solution whereby the angle of attack of the wing structure is increased in order to promote lift on the airplane as soon as the latter acquires speed during the take-off phase. However, a fixed wing structure with a high angle of attack leads, in flight, to considerable drag, which means that this solution is not widely used.

Another solution is to have the wheels of the front landing gear at a larger diameter than the wheels of the rear landing gear, so as to incline the fuselage and therefore the wing structure with respect to the relative airflow when taxiing along the ground during the take-off phase. The airplane thus has a nose-up trim and the angle of attack of the wing structure is increased. Nonetheless, during the phases of boarding and taxiing along the ground, the fuselage is not horizontal, and this is not desirable particularly for transporting passengers. Further, the large-diameter wheels of the front landing gear take up too much space under the fuselage and entail additional weight.

SUMMARY OF THE INVENTION

It is an object of the present invention to propose a new solution for shortening the take-off distance of jumbo jet airplanes equipped with tandem-wheel rear landing gears which gets around the aforementioned disadvantages of the earlier solutions.

To this end, the aircraft rear landing gear, of the type comprising a strut connected to said aircraft at its upper end and to a set of wheels at its lower end, is notable according to the invention:

in that, when said landing gear is in the lowered position, said strut has a variable height made to vary between at least a maximum height for which the trim of said aircraft is substantially horizontal and a minimum height for which the trim of said aircraft is nose-up;

in that said strut comprises a barrel articulated about said aircraft and a shock absorber bearing said set of wheels and mounted, such that it can slide, in an accommodating passage of said barrel in order to define a variable-volume internal fluidic chamber; and in that a source of fluidic power is connected to said internal chamber via a controllable shut-off member by virtue of which said source of fluidic power, depending on how said shut-off member is controlled, may fill or empty said internal chamber thereby varying the height of said strut so that the trim of said aircraft is horizontal or nose-up, respectively.

Thus, by virtue of the invention, simply controlling the height of the strut by filling or emptying the internal chamber allows the trim of the airplane to be modified when the rear landing gears are in the lowered, extended, position.

For example:

when the height of the strut is at a maximum (internal chamber full), the airplane has a substantially horizontal configuration for the phases of taxiing, boarding/disembarkation or parking without inconvenience to the passengers or to the loading/unloading of freight; and when the height of the strut is at a minimum (internal chamber empty), the airplane has a nose-up configuration for the ground take-off phase, increasing the angle of attack of the wing structure with amplified lift effects, thus shortening the take-off distance and making it possible to use runways of standard length.

The rear landing gear according to the invention therefore gets around the fixed solutions of the prior art with a fixed wing structure of high angle of attack or the use of different-diameter wheels, with their resultant disadvantages. Furthermore, creating the internal chamber by combining two telescopic components (barrel—shock absorber) is technically simple and reliable.

Of course, it is known that variable-height or variable-length landing gears already exist, but the purpose of this type of landing gear and the means of achieving them differ from those of the present invention. Often, the matter is one of shortening the landing gear heightwise (that is to say making it smaller) so that it can be housed in its small-sized landing gear well, or alternatively of lowering the landing gear so that freight can be loaded/unloaded. The means of achieving these functions use link rods, toggle levers, jacks, etc., with complex kinematics and joints and are therefore neither designed for nor suited to the rear landing gear of the invention, the purpose of which is to shorten the take-off distance by, in order so to do, altering the angle of attack of the wing structure and of which the means of lowering said landing gear are obtained by combining, inter alia, a variable-volume internal chamber between two telescopic elements, with an exterior fluidic source connected to said chamber.

In a preferred embodiment, said source of fluidic power comprises at least one accumulator connected to said internal fluidic chamber of said strut. In this case, said accumulator is of the type having a sliding piston subjected, on one side, to the action of the fluid contained in said internal chamber and, on the other side, to the action of a compressible gas.

For example, said compressible gas is helium and is contained in a bellows positioned between said piston and the end wall of said accumulator.

It will be noted that creating the source of power in the form of an accumulator guarantees substantial operational reliability, contains the weight and guarantees a low cost.

Advantageously, said controllable shut-off member positioned between said internal chamber of the strut and said source of power may comprise at least one selection valve that can be actuated by a control means and, according to the position of said valve and when said landing gear is lowered, allows fluidic communication between said internal chamber and said source of power to be established or cut off.

More specifically, said control means that controls said shut-off member is defined by at least one actuator moved by at least one semiconductor current control device connected to a central control unit module.

According to another feature of the invention, when the height of said strut is at its maximum, said internal fluidic chamber can be connected to the hydraulic braking system of the aircraft in the event of failure of that system. Thus, not only does the internal chamber allow the rear landing gear to be lowered, but its internal fluidic volume can be used as a back-up emergency source to actuate the wheel-braking units if the usual braking system (main or auxiliary) fails.

In a preferred embodiment, between said internal fluidic chamber of the strut and said shut-off member, there is a fluidic tapping comprising a solenoid valve block assembly that can be controlled and that leads to the wheel braking units, so that when said solenoid valve block assembly is rendered active following failure of the braking system and said shut-off member is shutting off access to said source of power, the fluid from said internal chamber is sent to said braking units.

For quick and reliable switching between the usual braking system and the internal chamber, a piston-type shuttle valve is positioned between the outlet of said solenoid valve block assembly and the supply connection of said braking system and is connected at its outlet to said braking units in order to send the fluid from said internal chamber to these units upon failure of said braking system.

Furthermore, it is known that said braking units are defined by stacks of disks (rotors—stators) pressed by pistons mounted in brake cylinders. In order to obtain effective braking by the fluid of the internal chamber, the cross-sectional area of said shock absorber mounted in the passage of said barrel delimiting said internal chamber more or less corresponds to the sum of the cross-sectional areas of the pistons of the cylinders which act on said brake disks.

In a preferred embodiment, each brake cylinder comprises two coaxial and concentric pistons, these being a central piston and an annular piston respectively, said central piston being subjected to the action of said hydraulic braking system in order to act on said disks and, in the event of failure of said system, said annular piston being subjected to the action of said fluid from said internal chamber in order to cause said central piston to move with it, which central piston acts on said disks.

Advantageously, the connection between the two pistons is defined by an internal step provided in said annular piston and pressing against said central piston.

BRIEF DESCRIPTION OF THE DRAWINGS

The figures of the attached drawing will make it easy to understand how the invention may be embodied. In these figures, identical references denote similar elements.

FIG. 1 is a plan view of one particular embodiment of an airplane according to the present invention.

FIG. 2 is a side view of the airplane of FIG. 1, resting on the ground, with the rear landing gears in the high position for which the airplane is substantially horizontal.

FIG. 3 is a view identical to FIG. 2 but with the rear landing gears in the low position for which the airplane is nose-up with a view to take-off.

DETAILED DESCRIPTION OF THE INVENTION

Figure 4:
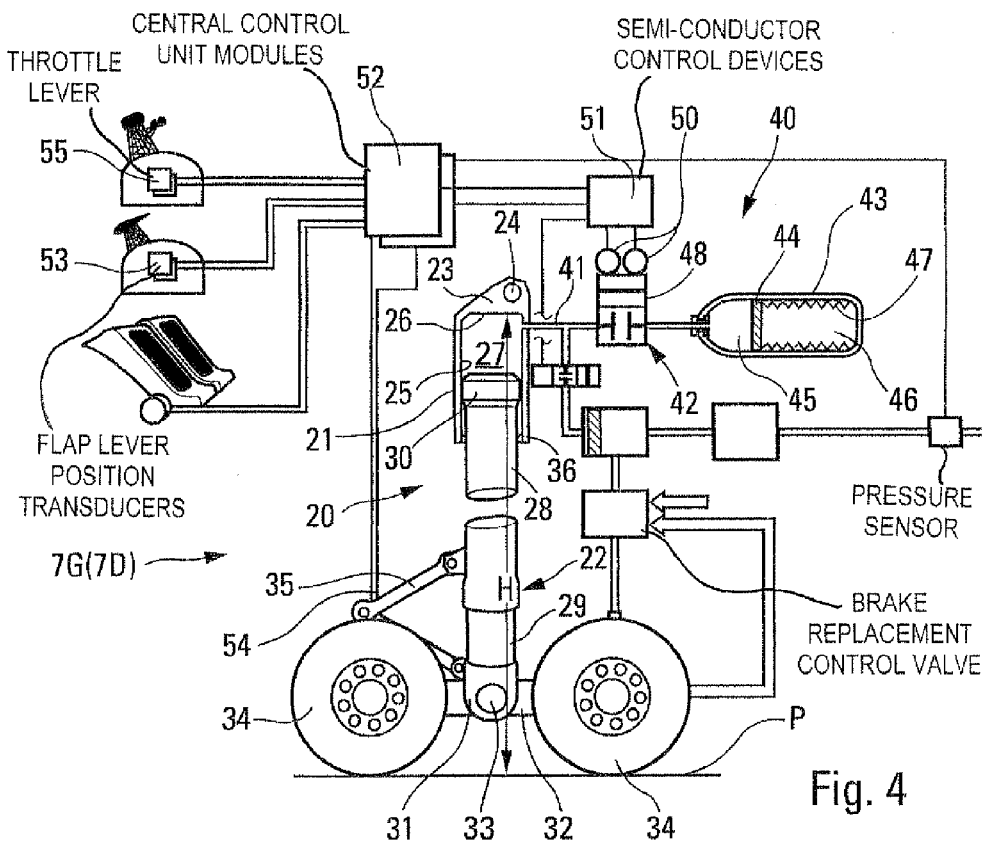
FIG. 4 is a schematic sectional view through one of the rear landing gears of said airplane, in the high position.

The airplane 1, according to the present invention and shown in FIGS. 1 to 3, comprises twin parallel fuselages 2G and 2D separated from one another symmetrically with respect to a vertical longitudinal mid-plane L-L.

The two fuselages 2G and 2D have identical exterior shapes. However, only one of them comprises a flight deck 3. Each of them delimits a passenger cabin 4G or 4D and comprises a front landing gear 5G or 5D that can be retracted into a front landing gear well 6G or 6D, and a rear landing gear 7G or 7D that can be retracted into a rear landing gear well 8G or 8D. Of course, the two front landing gears are identical as are the two rear landing gears. The latter are of the double tandem (bogie) type with four wheels each, and one of them will be described in detail later.

At the front, the airplane 1 of FIGS. 1 to 4 comprises a lower wing 9, provided with flaps, ailerons, etc. in the customary way and supporting the front lower parts of the two fuselages 2G and 2D. The front lower wing 9 is symmetric with respect to the vertical longitudinal mid-plane L-L and both its external parts 9G and 9D (external to the fuselages 2G and 20) and its internal part 91 (contained between said fuselages) are swept forward by an angle $\Phi a$, for example of the order of 20°.

At the rear, the airplane 1 of FIGS. 1 to 4 comprises an upper wing 10, provided with flaps, ailerons, etc. in the usual way and supported directly by the rear upper parts of the two fuselages 2G and 2D, without being held away from the latter by pylons or the like. The rear upper wing 10 is symmetric with respect to the vertical longitudinal mid-plane L-L and both its external parts 10G and 10D (external to the fuselages 2G and 2D) and its internal part 10I (contained between said fuselages) are swept forward by an angle $\Phi r$, for example of the order of 20°.

The surface area of the rear upper wing 10 is greater than the surface area of the front lower wing 9, which means that the lift of the latter is lower than that of said rear upper wing 10. For example, the respective lifts of the front lower wing and of the rear upper wing may be of the order of 40% and 60% of the total lift of the airplane 1.

The internal part 10I of the rear upper wing 10 carries a nacelle 11 containing a propulsion system comprising two turboprop engines, one of which comprises pusher propellers 12 and the other of which comprises tractor propellers 13. The axis l-l of said propulsion system and of the nacelle 11 lies in the vertical longitudinal mid-plane L-L.

The pusher propellers 12 and the tractor propellers 13 are respectively positioned behind and in front of the rear upper wing 10, so that any debris from said propellers 12 and 13, should these break, cannot reach this wing.

The airplane 1 additionally comprises, in the usual way, at least one vertical stabilizer 14 provided with at least one rudder 15.

As shown particularly by FIG. 4, the rear landing gear on the left 7G (or on the right 7D) comprises a strut 20 which is chiefly made up of a barrel 21 and of a shock absorber 22, generally of the oleopneumatic type, nested telescopically one inside the other.

In particular, the barrel 21 is articulated, at its top 23 corresponding to the upper end of the strut, to the structure (not depicted) of the relevant fuselage 2G (or 2D) of the airplane 1, about an axis of rotation 24 so as to allow the landing gear 7G to be raised (or retracted) or lowered (or extended) into or out of its gear well 8G, via a jack (not depicted) in the way known per se. Also formed in the barrel 21 is a blind cylindrical passage 25 with a transverse end wall 26, which opens into the bottom part 36 of the barrel. It may be seen from FIG. 4 that, when the landing gear is lowered, the passage 25 of the barrel is substantially vertical and accepts the oleopneumatic shock absorber 22 in order, with its transverse end wall 26, to delimit a variable-volume internal chamber 27 that allows the height of the strut 20 to be adjusted, as will be seen later.

More specifically, the shock absorber 22 is made up of a cylinder 28 and of a rod 29, said cylinder ending in a piston-shaped widened head 30 to slide appropriately and in a fluidtight manner in the accommodating passage 25 of the barrel and define, between the head of the cylinder and the transverse end wall of the passage, said variable-volume internal chamber 27. The rod 29 of the shock absorber is articulated at the bottom 31, corresponding to the lower end of the strut 20, to a rocker beam 32 by a pivot pin 33, which rocker beam carries two front wheels and two rear wheels 34 arranged respectively in tandem. An articulated landing gear torque link 35 also connects the cylinder 28 and the rod 29 of the shock absorber, in the known way, to prevent them from rotating one relative to the other.

A source of fluidic power 40 is advantageously connected to the variable-volume internal chamber 27 via a connection 41, such as a pipe or hose, on which a controllable fluidic shut-off member 42 is mounted. In this example, the source of fluidic power is an accumulator 43 of the type with a sliding piston 44 in which one side or compartment 45 of the accumulator may be placed in communication with the internal chamber 27 of the strut 20 and in which the other side or compartment 46 is placed under pressure by a helium-filled bellows 47.

The shut-off member 42 is, for example, a selection valve 48 which, in one of its two stable positions, either does or does not place the internal chamber 27 of the strut in communication with the corresponding compartment 45 of the accumulator 43.

This valve 48 is controlled, in this preferred embodiment, by two actuators 50 symbolized in FIG. 4 and which can be operated by two semiconductor current control devices 51, triggering of which is performed by central control unit modules 52 of the landing gears 7G-7D when certain conditions are simultaneously met, as will be seen later.

It is assumed, in FIGS. 2 and 4, that the height H of the strut 20, measured, for example, between the transverse end wall 26 of the internal chamber 27 and the point of contact of the wheels 34 with the ground of the runway P, is at a maximum because the volume of the internal chamber 27 is filled to a maximum and that this status is maintained by the position of the selection valve 48 which closes off the connection 41. It will also be noted that the bellows 47 of the accumulator is expanded under the action of the gas and occupies a substantial space thereof. In addition, the fluid contained in the internal chamber 27 is an explosion-proof hydraulic oil, for example a phosphate-ester based hydraulic oil.

Thus, as FIG. 2 shows, when the strut 20 of each rear landing gear 7G, 7D, in the lowered position has the height H, the trim of the airplane 1 resting on the runway P is substantially horizontal, as is common with all airplanes, particularly during the phases of taxiing, maneuvering, parking and loading.

By contrast, when the airplane 1 on the runway P is ready for the take-off phase, the variable-volume internal chamber 27 of each rear landing gear, initially filled with oil, can be emptied if the following three conditions supplied to the crew by the modules 52 are simultaneously met:
  the lift-generating devices are in the take-off position as recorded by the flap lever position transducers 53;
  the weight on the wheels is recorded by a rotary variable displacement transducer 54 installed on the pivot pin of the landing gear torque link 35; and
  at least one throttle lever 55 has been pushed forward into the take-off power position.

Figure 5:
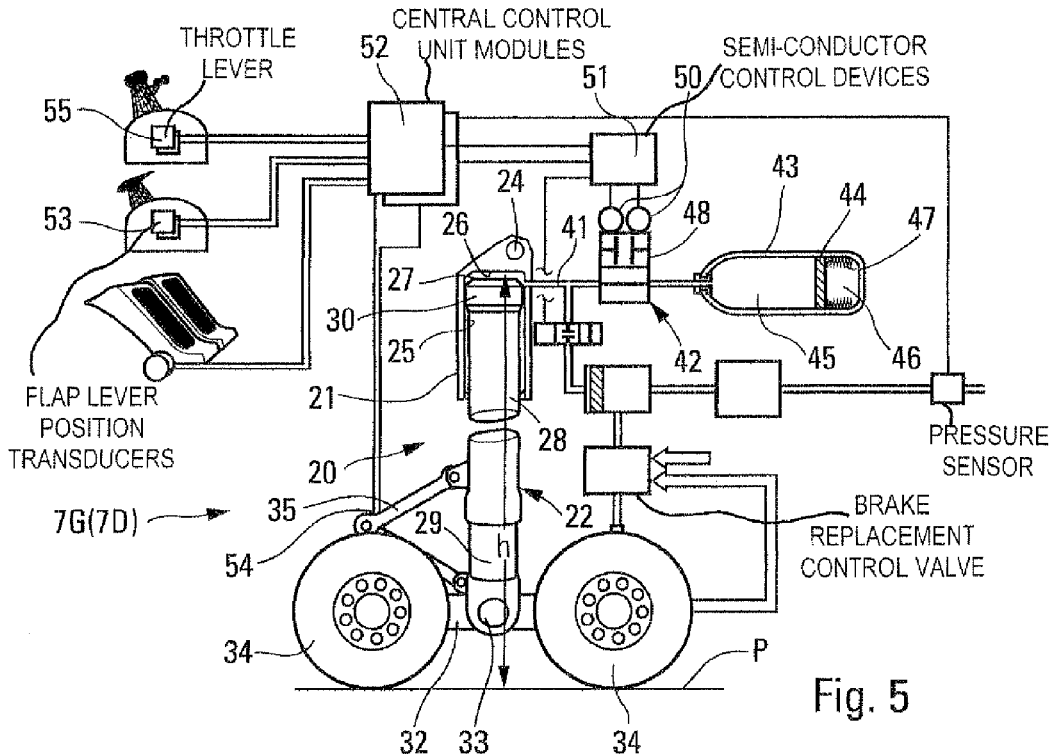
FIG. 5 is a schematic sectional view of said rear landing gear depicted in FIG. 4, in the low position.

The selection valve 48 is then operated to make it change position, as shown by FIG. 5, by the actuators 50 which are themselves controlled by the devices 51 that receive the orders from the modules 52 (in FIG. 5, the two positions of the valve have been switched by comparison with FIG. 4, without any movement of the actuators, but in real life these actuators, as they extend, will have moved the valve linearly). In this way, the variable-volume internal chamber 27 is placed in fluidic communication with the compartment 45 of the accumulator 43 by the connection 41. At the same time, under the weight of the airplane 1, the shock absorber 22 is forced back into the passage 25 of the barrel and the oil contained in the internal chamber 27 is expelled therefrom and sent into the compartment 45 of the accumulator 43, passing through the connection 41 and the valve 48 thereof, and drives the piston 44 such that the bellows 47 is concertinaed, compressing the gas.

The strut 20 then reaches its minimum height h because the chamber 27 is empty, the head 30 of the shock absorber 22 being close to the transverse end wall 26 of the passage 25, as shown by FIGS. 3 and 5. Further, the rear of each fuselage 2G, 2D is lowered by a distance equal to H-h substantially corresponding to the height of the chamber 27, so that the trim of the airplane 1 in contact with the runway P is inclined with a nose-up attitude of angle A.

For safety reasons, several rows of Hall effect proximity sensors (not depicted) are provided and move in alignment with each rear landing gear in its lowered deployed position and a status indication confirms to the crew that the airplane is in its correct nose-up attitude for take-off.

When the throttles have been opened and the brakes have been released, the airplane 1 accelerates along the runway with the fuselage in a nose-up trim at the angle A, offering the wings 9 and 10 to the air flow at an optimum angle of incidence A to encourage take-off from runways of standard length in spite of the substantial weight of the twin-fuselage airplane and the fact that it has tandem design of landing gears. When the lift forces reach the desired value, the airplane rises and takes off, keeping a substantially constant trim. Throughout this time, the selection valve 48 remains closed. When the weight applied to each rear landing gear, at the instant the airplane leaves the ground, is relieved, the weight of the oleopneumatic shock absorber 22, which expands, applies a downward force on the cylinder 28 inside the chamber 27 and in so doing helps the pressurized helium contained in the bellows 47 of the accumulator 43 to drive the piston 44 of the latter and return the oil from the compartment 45 to the chamber 27, causing a retaining valve, not depicted, positioned in the selection valve 48, to switch. This retaining valve allows oil to be transferred at a very high flow rate in the sense of deploying or extending the strut, thereby minimizing the time taken to refill the internal chamber, the accumulator 43 returning to its FIG. 4 position. A few seconds after take-off, with a confirmed rate of climb, the variable-length strut 20 of each rear landing gear 7G, 7D is in its fully extended lowered position and the retraction or raising of the landing gears can be begun on the orders of the crew.

For landing, the lift is gradually reduced using the angle of deployment of the various flaps, and the airplane touches down on the runway with a substantially horizontal trim and the rear landing gears down with a maximum height, the hydraulic braking system bringing the airplane to a standstill.

In the event of failure of the braking system in general (including both the main system and the auxiliary system) of the airplane 1, the hydraulic fluid contained in the internal chamber 27 of the strut 20 can advantageously be used as a back-up fluidic source for braking the airplane 1. Further, the weight of this airplane taxiing along the runway acts as a source of energy to send pressurized oil from the internal chamber 27 to the brakes because of the fact that the shock absorber has a tendency to be forced into the passage 25 of the barrel of the strut.

Figure 6:
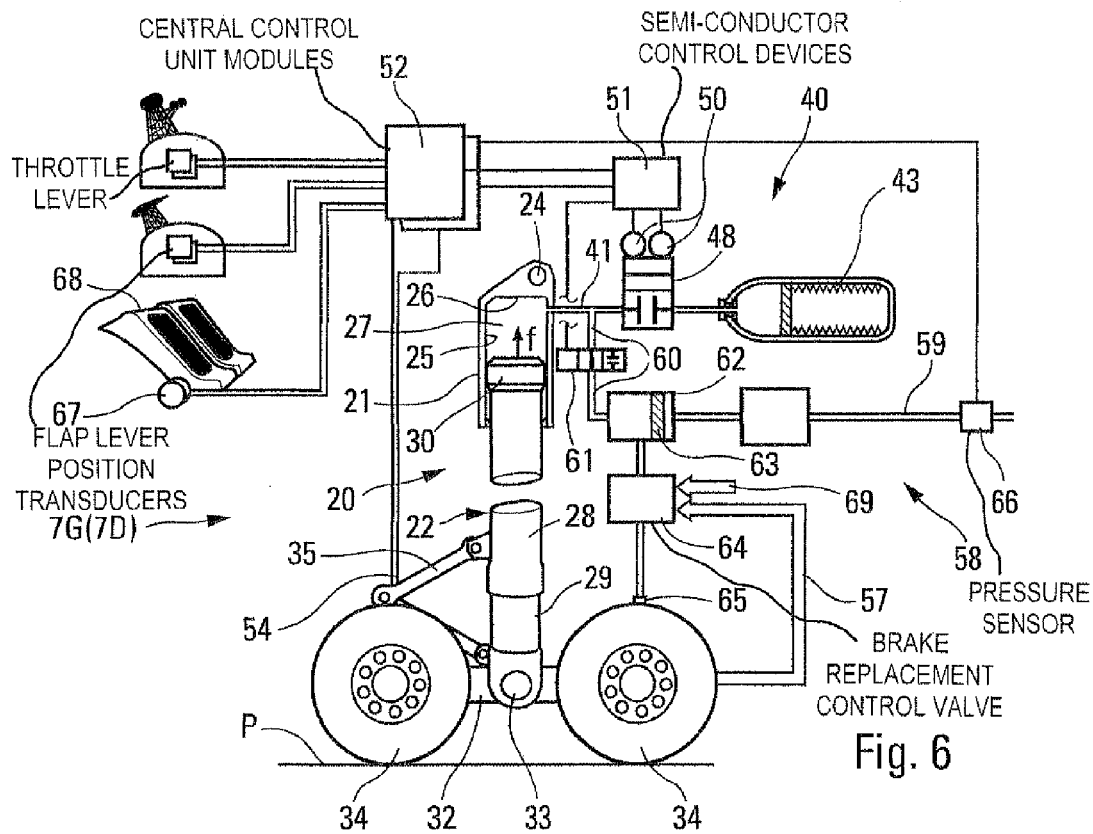
FIG. 6 is a schematic sectional view of said rear landing gear with the variable-volume internal chamber placed in communication with the braking units of said landing gear.

As FIGS. 4 to 6 show, a tapping 60 (pipe or hose) is provided between the connection 41, that connects the internal chamber 27 to the selection valve 48, and the supply connection 59 for the braking system 58, and this tapping 60 particularly comprises a solenoid valve block assembly 61 actuated by the control devices 51. This solenoid valve block assembly 61 of course occupies a closed position, shutting off the tapping 60, in FIGS. 4 and 5 when the trim of the airplane is being adjusted by lowering the rear of its fuselages and, by contrast, occupies an open position in FIG. 6, opening the tapping 60, when failure of the braking system has been detected. In such a circumstance, the selection valve 48 is closed rendering the accumulator 43 inoperative.

Furthermore, a shuttle valve 62 with sliding piston 63 is provided between the outlet from the solenoid valve block assembly 61 and the braking system 58 and receives, on one side, the tapping 60 of the solenoid valve block assembly 61 and, on the other side, the hydraulic supply connection 59 for the braking system 58. The outlet from this shuttle valve 62 then leads to a brake replacement control valve 64 which is itself in turn connected to the respective braking unit 65 for the wheels. This valve 64 also receives a signal 69 representative of the weight on the wheels and a signal 57 representative of the wheel speed data as a function of ground speed in order to modulate the pressure in the brakes and prevent the wheels from skidding.

The switchover to the emergency fluidic source (chamber 27) may be performed directly by the pilot, if loss of the (main and auxiliary) braking system 58 is noticed when the airplane is in contact with the runway or may take place automatically on the order of an emergency braking control function with in-built software that detects loss of system pressure using a pressure sensor 66 provided in the supply connection 59 and connected to the modules 52.

When the solenoid valve block assembly 61 is rendered active by its electrical supply from the control device 51, following a malfunctioning of the usual braking system, the transducer 67 situated on the brake pedal 68 then pressed by the pilot, sends an order which causes the solenoid control block assembly 61 to change position, switching it to the open position, as shown by FIG. 6. That allows the oil contained in the internal chamber 27, under the action of the shock absorber 22 subjected to the weight of the airplane and being forced into the barrel in the direction of the arrow f, to be forced under pressure from the internal chamber 27, to pass through the solenoid valve block assembly 61 through the tapping 60 and to move the position 63 of the shuttle valve 62 to the right in FIG. 6. What actually happens is that the hydraulic pressure in the braking system 58 and, therefore, in the supply connection 59, has dropped as a result of the malfunctioning. As a result, pressurized oil leaves the valve 62, passes through the control valve 64 to reach the braking unit 65, which brings the airplane to a standstill by contact between the disks pressed against one another by the pistons of the unit.

Given the volume of fluid contained in the internal chamber 27, numerous applications of or actions on the brakes are possible, certainly far more than can be performed with the emergency accumulator-based device usually provided on aircraft (in addition to the main and auxiliary systems) and which may be omitted and replaced by the landing gear according to the invention.

Thus, this substantial volume of fluid inside the internal chamber 27 may allow the airplane 1 to leave the runway and taxi to a given location without the need for a towing vehicle, thus reducing the runway occupancy time in the event of a total loss of braking.

Furthermore, in order to ensure that the force generated by the piston 30 head of the cylinder 28 of the shock absorber 22 on the brake disks is sufficient under emergency braking conditions, the surface area of the head 30 of the cylinder in the passage 25 needs to correspond to the surface area of the pistons that actuate the brake disks and which are distributed at equal angles apart around these disks, taking into consideration the downward force acting on the rear landing gear at the point of application of the brakes.

Figure 7:
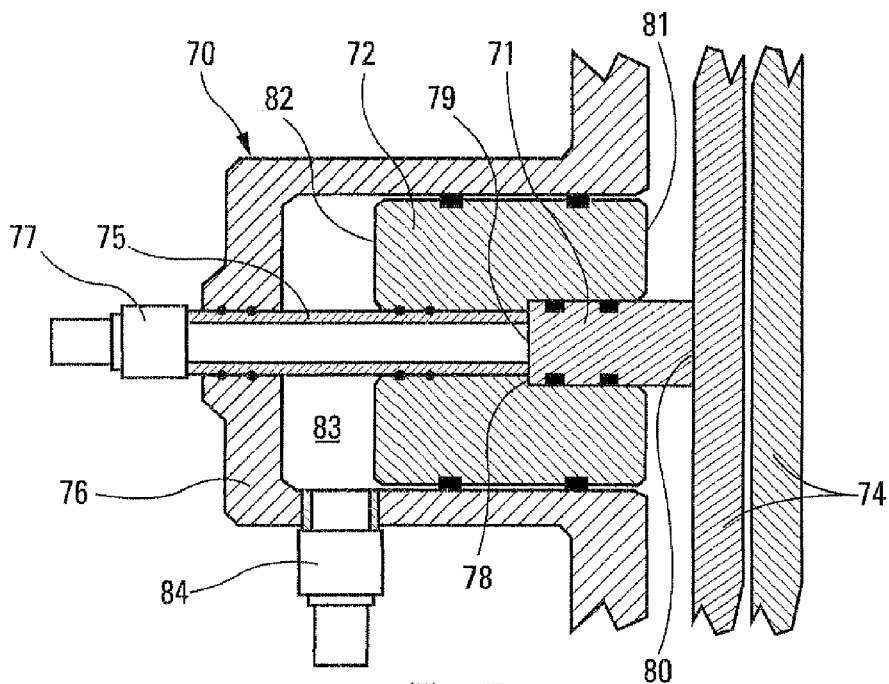
FIG. 7 is a schematic exemplary embodiment of one of the braking units, in longitudinal section.

In the exemplary embodiment illustrated in FIG. 7, each brake cylinder 70 of a braking unit 65 of a wheel 34 advantageously comprises, inside it, two coaxial and concentric pistons 71 and 72, of which the internal and central one 71 operates directly under the action of the usual braking system 1 and of which the external other one, 72, operates under the action of the back-up fluidic source 27 to cause the internal piston 71 to move.

In particular, the central piston 71 presses, on one side, against the collection of stacked disks 74 (rotors and stators) by a customary pressure plate and is connected, on the other side, to a central tube 75 passing in fluidtight manner through the end wall 76 of the cylinder 70 and connected by a connector 77 to the supply connection 59 leading from the main braking system 58. As for the annular external piston 72, it partially and in a fluidtight manner surrounds the central piston 71 and the central tube 75 and for that reason has an internal annular step 78 which butts against the rear transverse face 79 of the central piston from which the central tube 75 departs, while the transverse front face 80 of the internal piston projects with respect to that 81 of the external piston and acts on the disks via the pressure plate. The transverse rear face 82 of the external piston is distant from the end wall 76 of said cylinder 70 so as to define an annular space 83 connected, via a connection 84 external to the cylinder, to the supply connection leading from the back-up fluidic source 27.

Thus, when the main braking system is working, the central piston 71 of each brake cylinder 70 moves, under the action of the hydraulic fluid from the connection 59, in the external piston 72 which is fixed relative to the cylinder 70, and presses against the collection of disks 74 in order to halt the airplane. By contrast, when the back-up fluidic source or chamber 27 is rendered operational following failure of the braking system 58, via fluid from the internal chamber 27 and from the tapping 60 via the solenoid block assembly 61, the annular external piston 72 is driven by the fluidic pressure obtaining in the space 83 and presses, via its internal annular step 78, against the central internal piston 71, which acts on the set of disks 74.

Of course, the annular surface area of the external piston 72 is sized so that the appropriate force can be applied to the brake disks, taking into consideration the reduced fluidic pressure supplied by the back-up fluidic source, the pressure available being a function of the surface area of the piston 30 head of the cylinder of the shock absorber 22 and of the weight acting on the rear landing gear at the instant the back-up braking is applied.

The invention claimed is:

1. A short take-off distance aircraft comprising at least one front landing gear and one rear landing gear,
   wherein the at least one rear landing gear comprises:
   a strut connected, at an upper end of the strut, to said aircraft and bearing a set of wheels at a lower end of the strut,
      wherein, the strut is positionable to modify aircraft trim during a take-off phase and increase wing structure incidence and resultant lift,
      said strut being configured to have a variable height at a lowered position, in which the strut is variable between a maximum height at which said aircraft has a substantially horizontal trim and a minimum height at which said aircraft has a nose-tip trim;
      said strut comprising a barrel articulated about said aircraft and a shock absorber bearing said set of wheels and, said shock absorber being slidably mounted in an accommodating passage of said barrel, which defines a variable-volume internal fluidic chamber; and
   a source of fluidic power connected to said variable-volume internal chamber via a controllable shut-off member and which is configured to fill or empty said internal chamber with fluid and vary the height of said strut between the maximum height at which said aircraft has the substantially horizontal trim and the minimum height at which said aircraft has the nose-up trim.

2. A rear landing gear or an aircraft comprising:
   a strut having an upper end adapted to connect to said aircraft and bearing a set of wheels at lower end of the strut,
      wherein, the strut is positionable to modify aircraft trim during a take-off phase and increase wing structure incidence and resultant lift,
      said strut being configured to have a variable height at a lowered position, in which the strut is variable between a maximum height at which said aircraft has a substantially horizontal trim and a minimum height at which said aircraft has a nose-up trim;
      said strut comprising a barrel at an upper end of said strut and a shock absorber bearing said set of wheels and mounted in an accommodating passage of said barrel, which defines a variable-volume internal fluidic chamber; and
   a source of fluidic power connected to said variable-volume internal chamber via a controllable shut-off member and which is configured to fill or empty said internal chamber with fluid and vary thereby the height of said strut between the maximum height at which said aircraft has the substantially horizontal trim and the minimum height at which said aircraft has the nose-up trim.

3. The landing gear as claimed in claim 2, wherein said source of fluidic power comprises at least one accumulator connected to said internal fluidic chamber of said strut.

4. The landing gear as claimed in claim 3, wherein said accumulator is comprised of a sliding piston subjected, on one side, to action of the fluid contained in said variable-volume internal chamber and, on another side, to action of a compressible gas.

5. The landing gear as claimed in claim 4, wherein said compressible gas is helium and is contained in a bellows positioned between said piston and an end wall of said accumulator.

6. The landing gear as claimed in claim 2, wherein said controllable shut-off member positioned between said internal chamber of the strut and said source of power comprises at least one selection valve actuatable by a control unit and, according to a position of said valve and when said landing gear is lowered, allows fluidic communication between said internal chamber and said source of power to be established or cut off.

7. The landing gear as claimed in claim 6, wherein said control unit that controls said shut-off member is defined by at least one actuator moved by at least one semiconductor current control device connected to a central control unit module.

8. The landing gear as claimed in claim 2, wherein, when the height of said strut is at a maximum, said internal fluidic chamber is configured to connect to a hydraulic braking system of the aircraft in the event of braking system failure.

9. The landing gear as claimed in claim 8, wherein, a fluid tapping is between said internal fluidic chamber of the strut and said shut-off member, with the fluidic tapping comprising a solenoid valve block assembly that can be controlled and that leads to wheel braking units, so that when said solenoid valve block assembly is rendered active following failure of the braking system and said shut-off member is shutting off access to said source of power, the fluid from said internal chamber is sent to said braking units.

10. The landing gear as claimed in claim 9, wherein a piston-type shuttle valve is positioned between an outlet of said solenoid valve block assembly and a supply connection of said braking system and is connected to said braking unit in a configuration that sends the fluid from said internal chamber to the braking system upon failure of said braking system.

11. The landing gear as claimed in claim 8, wherein said braking system is comprised of braking units defined by stacks of disks pressed by pistons mounted in brake cylinders, wherein a cross-sectional area of said shock absorber mounted in the passage of said barrel delimiting said internal chamber corresponds to a sum of cross-sectional areas of the pistons of the cylinders which act on said brake disks.

12. The landing gear as claimed in claim 11, wherein each brake cylinder comprises two coaxial and concentric pistons, being a central piston and an annular piston respectively, said central piston being subjected to action of said hydraulic braking system and configured to act on said disks and, in the event of failure of said system, said annular piston being subjected to action of said fluid from said internal chamber and configured to cause said central piston to move, which central piston acts on said disks.

13. The landing gear as claimed in claim 12, wherein the two pistons are connected by way of an internal step provided in said annular piston and pressing against said central piston.

* * * * *